SR
XR 4,523,973

United States Patent [19]

Nelson

[11] Patent Number: 4,523,973

[45] Date of Patent: Jun. 18, 1985

[54] METHOD AND APPARATUS FOR AUTOMATED CHEMICAL MILLING OF COMPOUND CURVED SURFACES

[75] Inventor: Carl Nelson, Anaheim, Calif.

[73] Assignee: Aerochem, Inc., Orange, Calif.

[21] Appl. No.: 542,790

[22] Filed: Oct. 17, 1983

[51] Int. Cl.[3] ........................... C23F 1/02; B44C 1/22; C03C 15/00; C03C 25/06

[52] U.S. Cl. .................................... 156/626; 156/627; 156/639; 156/645; 156/651; 156/659.1; 156/345; 219/121 LG

[58] Field of Search ............... 156/626, 627, 639, 645, 156/651, 659.1, 661.1, 664, 345; 428/598, 600; 219/121 LG; 73/649, 570, 584, 618, 620, 627, 645

[56] References Cited

U.S. PATENT DOCUMENTS

| | | | |
|---|---|---|---|
| 2,827,724 | 3/1958 | Edds | 156/626 |
| 2,933,675 | 4/1960 | Hoelzle | 156/626 X |
| 3,885,422 | 5/1975 | Dini | 156/626 X |

*Primary Examiner*—William A. Powell
*Attorney, Agent, or Firm*—James E. Brunton

[57] ABSTRACT

A method and apparatus for chemically milling large sheet metal workpieces and the like to uniform wall thickness in which all wall thickness measurements and all cutting of the protective maskant which is applied to the surfaces of the workpiece is accomplished automatically and with extreme precision through the use of a computer directed robot.

23 Claims, 7 Drawing Figures

METHOD AND APPARATUS FOR AUTOMATED CHEMICAL MILLING OF COMPOUND CURVED SURFACES

BACKGROUND OF THE INVENTION

1. Field of the Invention

The present invention relates generally to chemical milling of metallic materials. More particularly the invention concerns a unique method and apparatus for automatically measuring, scribing, chemically milling and inspecting sheet metal workpieces including workpieces having a compound curved surface.

2. Discussion of the Prior Art

Chemical milling may be defined as a process of etching the surfaces to be milled by chemical attack. The techniques for chemical milling of metallic workpieces are well known and have proven particularly useful in the past for applications wherein it is desired to remove specific amounts of material in predefined areas of aluminum, magnesium, titanium or steel sheet material after the sheet has been either rolled or stretch formed. As a practical matter, it is not feasible to mechanically mill large sections of sheet material, and particularly sheet material having a compound curved surface, due to equipment limitations and great expense. However, in many applications, including aerospace applications, where part weight and wall thickness tolerances are critical, precision milling of large sheet metal components is frequently required. Chemical milling has proven quite valuable and is widely used in such applications.

The standard approach followed in the past in chemical milling sheet workpieces to a uniform wall thickness was to first measure the wall thickness of the part at a multiplicity of points. The wall thickness data thus obtained was then used to draw contour lines on the surface of the part which represented regions of greater and lesser wall thickness.

Initially, the thickness gaging step was accomplished through the use of an ultrasonic transducer which, when coupled by a wet film to the surface of a metal plate, could measure thickness by its relation to the time between energy pulse echos from the two surfaces of the material being scanned. More recently the non-destructive testing industry has developed a system whereby a focused energy beam can be made to travel to and echo from a metal part within a moving column of water which impinges on the surface of the part and functions as the beam carrier medium. This advantageously enables the thickness measurements to be taken without the probe coming into physical engagement with the surface of the part. Exemplary of such a thickness measurement device is a unit manufactured and sold by NDT Instruments of Huntington Beach, Calif.

After the contour lines were drawn on the surface of the part, the next step in the prior art procedures was to cover the surface of the part with a thin film of vinly plastic, gelatin, rubber base material, or other etch-proof film, or maskant. This was done by spraying, painting, dipping or otherwise applying the maskant to the surface of the part. Due to the substantial transparency of the maskant, the contour lines drawn on the part surface remained visible. Next, using a sharp knife or razor blade, a portion of the maskant was cut away by hand as, for example, along the contour lines of an area of greater wall thickness. The part was then immersed into the etching bath which comprised acid, a suitable caustic, or other chemical attacking means. Since the maskant protected all the surface save the unprotected area, only this area would be attacked by the chemical and would be milled away. The amount of material removed was, of course, dependent on several factors, such as temperature, time, chemical concentration and the type of starting material. However, those skilled in the art were able to precisely and uniformly control the amount of material which was removed. Successive steps of cutting away the maskant from other portions of the part, reimmersing of the part into the etching bath and continued gaging of the etched areas permitted precise milling of the surface of the part to a desired uniform wall thickness. A typical prior art technique for chemical milling using a polyvinyl maskant is described in U.S. Pat. No. 2,739,047 issued to Manuel C. Sanz.

After the part was milled to the desired wall thickness, it was then frequently necessary to repeat the chemical milling steps to provide engineering features such as ribs, embossments, lands and the like at specified locations on the part. To mill these engineering features it was, of course, necessary to re-mask the part, selectively cut away portions of the maskant and successively immerse the part in the etching solution to form the required engineering features.

Particularly with large parts, the time required to gage and mark the surface areas to be etched was highly labor intensive, often involving many man hours. Similarly, the repeated spraying, painting or otherwise covering the part surface with maskant to accomplish the wall thickness milling and the milling of the engineering features was time consuming, costly and frequently troublesome and hazardous. Finally, the cutting of the maskant by hand followed by the successive etching, rinsing and recutting steps was tedious, time consuming and most cost ineffective. It is these and other drawbacks of the prior art processes which have been uniquely overcome by the novel method and apparatus of the present invention.

As will become apparent from the discussion which follows, in accordance with the method of the present invention, the as received part is initially covered with maskant and the entire wall thickness gaging is accomplished automatically and in a highly novel manner by a rectilinear type robot, or similar robotic device. During the gaging step, all the wall thickness data taken by the robot is entered into a host computer for manipulation and later recall. Next the data defining the specific engineering features desired on the particular part is entered into the computer. The gaging sensor carried by the robot is then replaced with a suitable cutting device, such as a low power laser. The rectilinear robot is then drivably interconnected with the computer through a robot controller and the maskant is automatically cut along selected lines in accordance with the wall thickness and engineering data previously entered into the computer. The part is then milled in the exposed areas to simultaneously achieve both the desired wall thickness and engineering features. After all the required maskant cutting and milling steps have been completed, the gaging sensor is once again mounted on the robot and the part is automatically inspected and the inspection data is entered into the computer for verification of compliance with proscribed specifications.

SUMMARY OF THE INVENTION

It is a primary object of the present invention to provide a novel and highly cost effective method and apparatus for chemically milling large sheet metal workpieces and the like to uniform wall thickness in which all wall thickness measurements and all cutting of the protective maskant is accomplished automatically and with extreme precision through the use of a computer directed rectilinear robot.

More specifically it is an object of the invention to provide a method and apparatus of the aforementioned character which is markedly superior to conventional prior art manually conducted chemical milling operations and one which minimizes processing time, permits substantial savings in labor and at the same time markedly decreases the chances for operator error.

In particular, it is an object of the present invention to provide a novel method and apparatus for automatically chemically milling large sheet metal parts to specified wall thicknesses in which a maskant covered part is first gaged using a rectilinear robot and an ultrasonic sensor to determine the precise wall thickness of the part at a multiplicity of locations. The data thus obtained is entered into a host computer which has been programmed to develop a surface contour plot of the thick and thin areas of the part. After measurement is complete, the ultrasonic sensor is replaced by a cutting device such as a low power laser adapted to cut through the maskant without causing any damage to the part. The computer is then operably coupled with the robot to drive the robot in a manner to cause the laser to transverse one or more of the previously defined contour lines so as to cut accurately the maskant along such lines. Following the cutting of the maskant along the selected contour lines, the maskant is stripped away from the thickest area, all other lines are sealed, and the part is immersed in the etching bath to remove material in the unprotected areas. The part is then rinsed and the maskant stripping process is repeated. Through successive repetitions of the process, the part can be precisely milled to the desired wall thickness. The low power laser, or other suitable maskant cutter, is then replaced with the ultrasonic sensor and the part is finally inspected to assure compliance with specifications.

It is another object of the invention to provide a method of the character described in the preceding paragraph in which the host computer is programmed to receive engineering feature data as well as data from the gaging sensor and to manipulate the combined data so that the successive steps of cutting the maskant and chemical milling of the part will result in obtaining both the desired wall thickness and the specified engineering features for a given part in a minimum number of steps.

It is a further object of the invention to provide a method and apparatus of the aforementioned character in which the sensor and laser carrying head of the rectilinear robot is readily movable relative to the workpiece along X, Y and Z axes by manual, electro-mechanical or hydraulic means.

It is another object of the invention to provide an apparatus as described in the previous paragraphs in which the sensor and laser carrying head of the rectilinear robot is readily adjustable relative to the workpiece so that the sensor and laser can be maintained perpendicular to the surface of the workpiece during gaging and cutting operations.

It is still another object of the invention to provide a method of the aforementioned character in which the gaging sensor functions in a manner such that the initial echo received by the sensor when the sound pulse from the piezo-electrical crystal of the device strikes the surface of the maskant is ignored and a timing device is started only when the echo resulting from the pulse striking the first surface of the workpiece is received. The timing device is then stopped when the echo produced by the pulse striking the second surface of the workpiece is received. In this way the wall thickness of the workpiece at the point of measurement is accurately determined and the thickness of the maskant at that point is ignored.

Yet another object of the invention is to provide an apparatus in which very large sheet metal sections can be handled and precisely indexed relative to the robot and in which operations can be performed simultaneously on both sides of the sheet metal sections to produce matching engineering features.

Still another object of the invention is to provide an apparatus of the character described in which both large planar sheet metal sections as well as large sheet metal sections having compound curved surfaces can be processed.

These and other important objects of the invention will become apparent from the description which follows.

DESCRIPTION OF THE INVENTION

Figure 1:
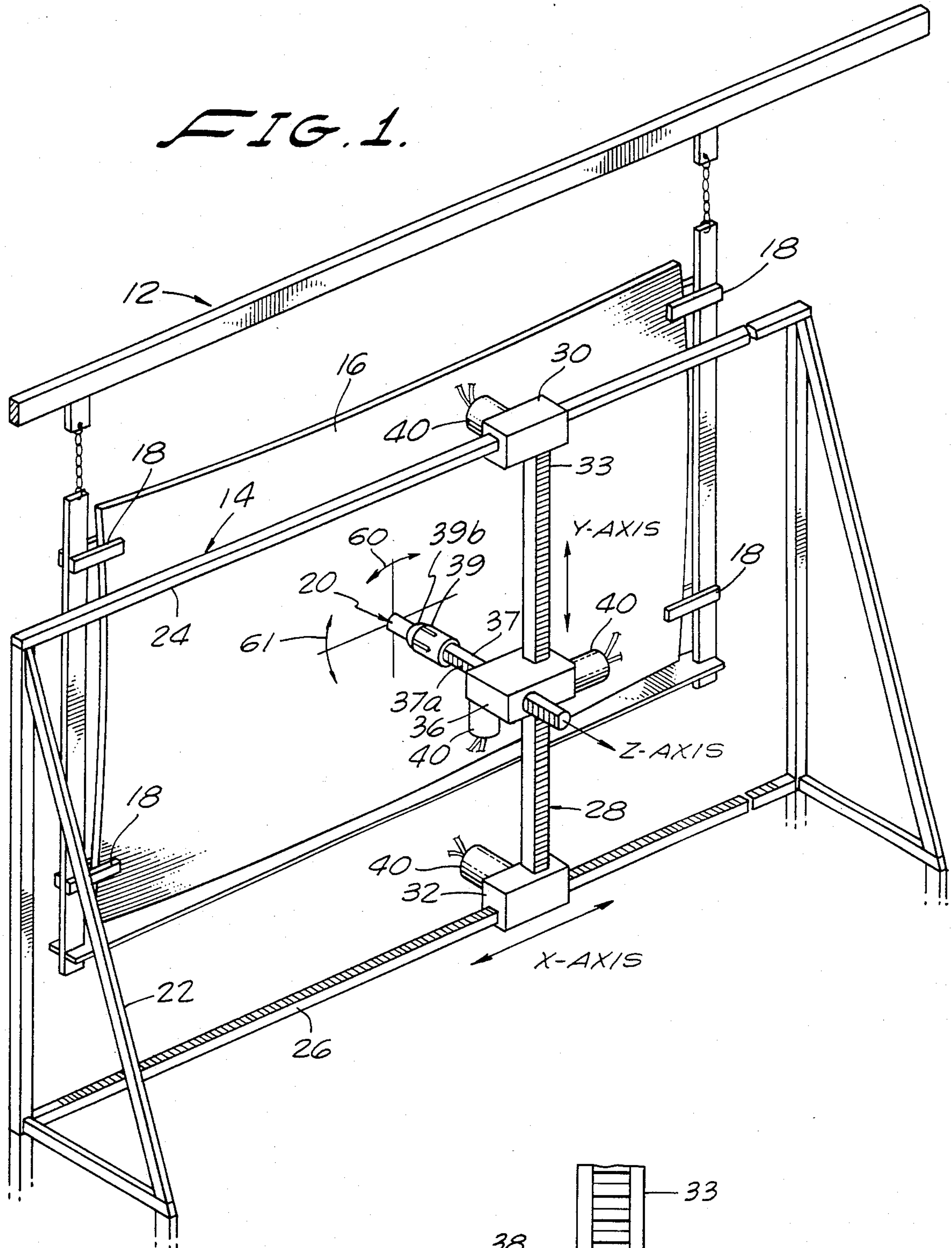
FIG. 1 is a generally perspective view of the apparatus of the invention including a workpiece holding structure and a rectilinear robot mechanism adapted to perform various processing operations on the workpiece.

Referring to the drawings and particularly to FIG. 1, the apparatus of the present invention, which is adapted for use in connection with the chemical milling of workpieces, comprises a workpiece supporting frame 12 and a rectilinear robot apparatus; generally designated by the numeral 14. In the form of the invention shown in the drawings, the workpieces to be addressed are large, thin, generally planar, or alternatively compound curved plates 16 which are held in a generally vertical orientation by the supporting frame 12. The workpiece 16 may be aluminum, magnesium, titanium, steel or other metal sheet material which has either been rolled or stretch formed to the approximate shape required for the particular end product use.

The workpiece 16 in its unprocessed form is typically of non-uniform wall thickness and must be processed by chemical milling techniques to achieve a final product of generally uniform wall thickness. The final product specifications may also require engineering features such as ribs, relief portions or the like which are also preferably formed by chemical milling techniques. Part 16 is precisely indexed within the supporting frame 12 through the use of known means such as tooling holes, or clamps, 18 which repeatedly index the part into a desired orientation. In this way the part can periodically be removed for chemical etching and then be replaced for further processing within supporting frame 12 in precisely the same position each time.

The robot apparatus 14 of the present invention comprises a tool holder 20 and first, second and third means for moving the tool holder rectilinearly in first, second and third directions respectively relative to the workpiece 16. More particularly, these means function to move the tool holder, and the tool connected thereto, along the X, Y and Z axes of the apparatus as identified in FIG. 1. As shown in FIG. 1, the robot apparatus here considered comprises a support structure 22, first and second spaced apart generally horizontally extending tracks 24 and 26 carried by the support structure and a carriage 28 reciprocally movable along tracks 24 and 26. Carriage 28 comprises upper and lower housings 30 and 32 and a vertically extending track 33 interconnecting said housings. A shuttle means, including a housing 36, is carried by the vertically extending track 33 and is adapted for vertical reciprocal movement therealong.

Figure 2:
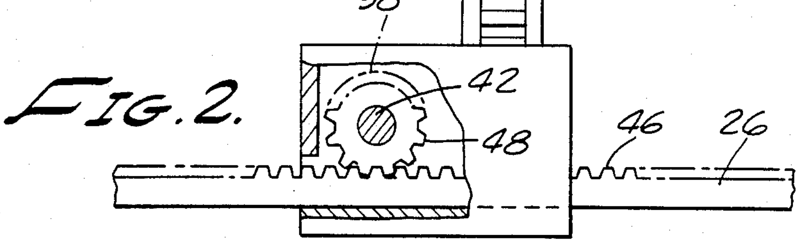
FIG. 2 is a greatly enlarged, fragmentary side elevational view partly in cross-section illustrating the construction of the drive mechanism of the robot which is used to controllably drive the working tool of the apparatus in various directions with respect to the surface of the workpiece.

Housings 30 and 32 function to enclose a first drive means of the general character illustrated in FIG. 2 for controllably driving the carriage 28 to and fro along tracks 24 and 26. Similarly housing 36 functions to enclose a second drive means adapted to drive the shuttle means reciprocally along track 33. Housing 36 also functions to support a tool holding means and a third drive means adapted to move the tool holding means along a straight line toward and away from the workpiece 16.

The tool holding means of the instant form of the invention comprises an elongated member 37 having upstanding teeth 37*a* formed along one surface thereof and a two degree of freedom "wrist" connector 39 adapted to carry one of the several types of tools used in the practice of the invention. Connector 39 may be provided in several forms, but is here shown as basically a "socket" portion adapted to receive a rotatable "ball" portion 39*b* which, in turn, is counterbored to receive the shank portion of the selected tool.

Referring to FIG. 2, which is a fragmentary cross-sectional view of housing 32 and the first drive means housed therewithin, the drive means in this form of the invention comprises a pinion gear 38 which is rotatably driven by a direct current stepping motor 40 (FIG. 1) through a shaft 42. The first drive means shown in FIG. 2 is typical of the construction of the second and third drive means as well and, in the present form of the invention each of the tracks 14, 26 and 32 are provided in the form of elongated rack members of the type identified in FIG. 2 by the numeral 24. Each of the racks, which comprise the track portions of the invention, are provided with upstanding teeth 26 which operably engage the teeth 48 formed on the pinion gear 38. With this construction it is apparent that clockwise rotation of pinion gear 38 as viewed in FIG. 2 will cause housing 32 along with vertical track 33 to move to the left as viewed in FIG. 2. The drive means which is housed in upper housing 30 is preferably driven synchronously with the drive means illustrated in FIG. 2 so that the entire carriage 28 will move uniformly along tracks 24 and 26 in a direction determined by the direction of rotation of the pinion gears 38. In similar fashion, housing 36 of the shuttle means, along with the tool holder means, will be driven up or down by a pinion gear 38 interengaging the upstanding teeth formed on track 33. The third drive means of the invention also comprises a pinion gear 38 adapted to operably engage teeth 37*a* formed on elongated member 37 of the tool holding means of the invention. With this construction, rotation of the pinion gear 38 by a stepping motor 40 will cause reciprocal movement of the tool holding means rectilinearly toward and away from the workpiece 16.

With the construction described in the preceding paragraphs, it is apparent that upon activation of the first drive means of the invention the carriage 28 will be moved rectilinearly along tracks 24 and 26. Similarly, actuation of the second drive means of the invention will cause housing 38 along with the tool holding means of the invention to move rectilinearly upwardly and downwardly along track 33. Finally, activation of the third drive means of the invention carried within housing 36 will result in reciprocal movement of the tool holding means and the tool of the invention rectilinearly toward and away from the workpiece along the Z axis of the robot. It is to be understood that mechanisms other than the rack and pinion mechanisms shown in the drawings can be used as the drive means. For example, rectilinear movement of the tool holder can also be achieved using cable and pulley mechanisms driven by stepping motors or the like, or the desired movement of the tool holder can be accomplished manually.

When the apparatus of the invention is used for measuring the wall thickness of the workpiece at a multiplicity of locations, a measuring means in the form of an ultrasonic thickness sensor is carried by the wrist connector 39 of the tool holding means of the invention. This ultrasonic thickness sensor, the general construction and operation of which is illustrated in FIGS. 3 and 4, is a commercially available device which can be obtained from several manufacturers, including NDT Instruments Company of Huntington Beach, Calif.

Figure 3:
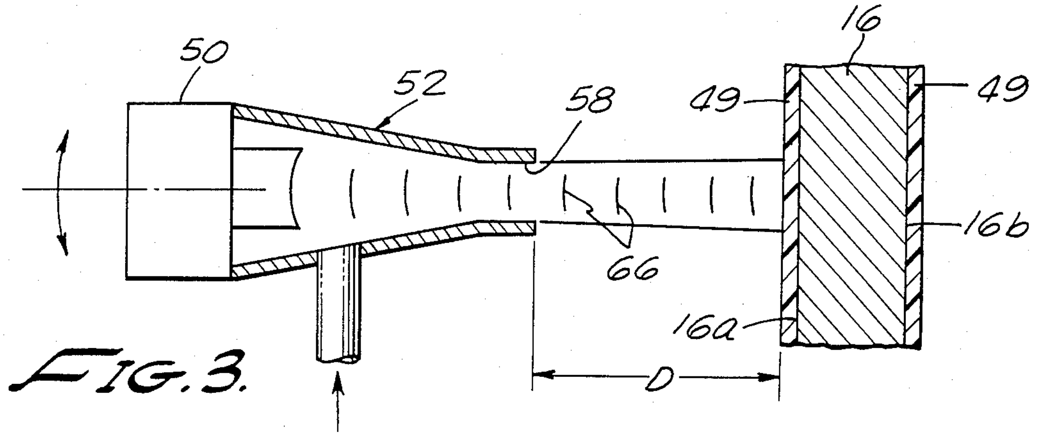
FIG. 3 is a generally schematic view of the ultrasonic measuring sensor device of the apparatus.

Referring to FIG. 3, the ultrasonic thickness sensor is shown in a spaced apart orientation with respect to the workpiece 16 which has been covered with a thin plastic maskant 49. The thickness sensor used in the practice of the method of the present invention comprises a shank portion 50 adapted to be closely received within the bore formed in ball 39*b* of the wrist connector, a housing 52 and a piezo-electrical crystal 54 carried within housing 52. Water from an external source, which can be introduced into housing 52 through a conduit 56, is directed toward the workpiece 16 in a steady stream through an outlet 58 formed in the front portion of housing 52. The piezo-electrical crystal 54 generates energy pulses which are transmitted down the flowing column of water toward the workpiece 16. The constantly flowing water column permits thickness measurements to be made without any physical contact being made between the workpiece and the housing 52 of the sensor. Additionally, the flowing water column allows the distance D between the sensor and the workpiece to vary within limits of several tenths of an inch without substantial degradation of the measurement accuracy of the device. The two degree of freedom wrist connector 39 permits the sensor to be accurately adjusted to position it substantially perpendicularly to the workpiece 16 so that the echos produced when the sound waves strike the workpiece will be reflected directly back to the crystal 54 to enable their detection by the sensor device. This two degree freedom of movement of the wrist connector is illustrated by the arrows 60 and 61 in FIG. 1. For certain applications it may be desirable to motorize the wrist connection to provide means for automatic and continuous alignment of the sensor perpendicularly to the workpiece. Such automation of the device can readily be achieved by those skilled in the art.

Figure 4:
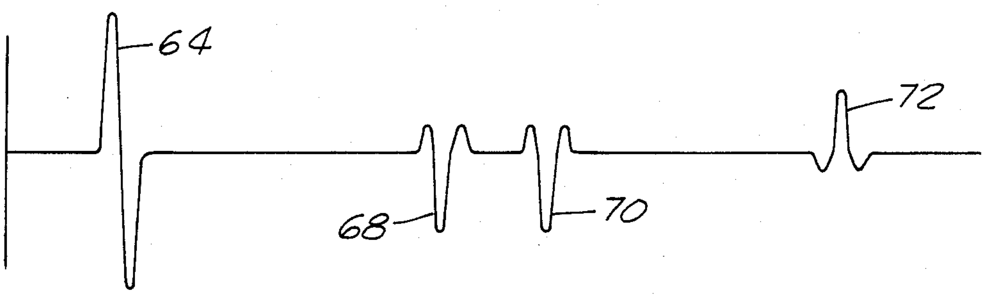
FIG. 4 is a generally schematic view illustrating the manner in which data is received from the ultrasonic measuring device.

Turning now to FIG. 4, where the operation of the ultrasonic sensor is illustrated, the initial pulse or excitation recording is shown in FIG. 4 by the numeral 64. As the energy waves 66 (FIG. 3) travel toward the maskant covered workpiece, the waves will first be reflected from the front surface of the maskant 62. This signal, which represents the reflected wave, or "echo", is shown as a strong crisp signal 68. As the sound waves penetrate the maskant and strike the front face **16*a* of the workpiece 16, a second crisp echo, indicated by the numeral 70, will be sensed by the ultrasonic sensor. A third and final echo 72, which is inverted in phase for echos 68 and 70, will be received by the crystal when the sound waves strike the rear, or back, face 16*b* of the workpiece 16. The sensor device typically includes electronic signal means for generating and transmitting electrical signals corresponding to the sound wave echos received by the crystal 54**. However, since the circuitry involved is standard and well understood in the art, the details thereof will not be described herein.

In order to measure the thickness of the workpiece 16, at the point of impact of the soundwaves 66, it is necessary to accurately measure the time elapsed between the echo 70 and the echo 72. This is typically accomplished by an electronic timer which is activated on the lower side of the wave form 70 and is stopped upon sensing of the echo signal depicted in FIG. 4 by the wave form 72. Knowledge of the type of metal from which workpiece 16 is formed and simple calculations using the elapsed time data obtained enables ready calculation of the wall thickness of the workpiece 16 at each point of measurement.

It is to be understood that the ultrasonic sensor illustrated in FIG. 3 and described in the previous paragraphs, itself forms no part of the present invention and several types of ultrasonic sensors other than the NDT sensor are commercially available and can be used or modified for use in connection with the apparatus of the present invention. Similarly, the precise techniques and required circuitry for sensing the sound wave echos measuring elapsed time and calculating the wall thickness of the workpiece from the data received, is well known to those skilled in the art and will not be discussed in precise detail herein.

Using the apparatus of the invention as illustrated in FIGS. 1 through 4, the actual measurement of the wall thickness of the workpiece 16 can be accomplished in several ways. Perhaps the easiest and most straightforward way of accomplishing these measurements is to define on the surface of the workpiece a fine grid comprising a multiplicity of intersecting horizontal and vertical lines. Such a grid is diagramatically illustrated in FIG. 5. By aligning the ultrasonic sensor at each point defined by the intersection of the grid lines, it is apparent that the multiplicity of wall thickness measurements can be made at defined locations across the entire surface of the workpiece 16. Once the wall thickness of the part is known at each of these multiplicity of points, the workpiece can be divided into several regions and the measurement points exhibiting the same wall thickness can be actually or theoretically interconnected to form a topographic-like plot of the wall thickness of the workpiece. This plot, like a topographic map, will define the contour of the part and will make readily apparent the specific areas of the workpiece which are of greater and lesser wall thickness.

Once this topographic or contour plot is completed, the maskant can then be scribed using an appropriate cutting tool. After scribing and line sealing, the maskant can be successively stripped away to expose selected regions of the part into the chemical etching solution. The details of this scribing and chemical etch process in accordance with the method of the present invention will be discussed in the paragraphs which follow.

Figure 5:
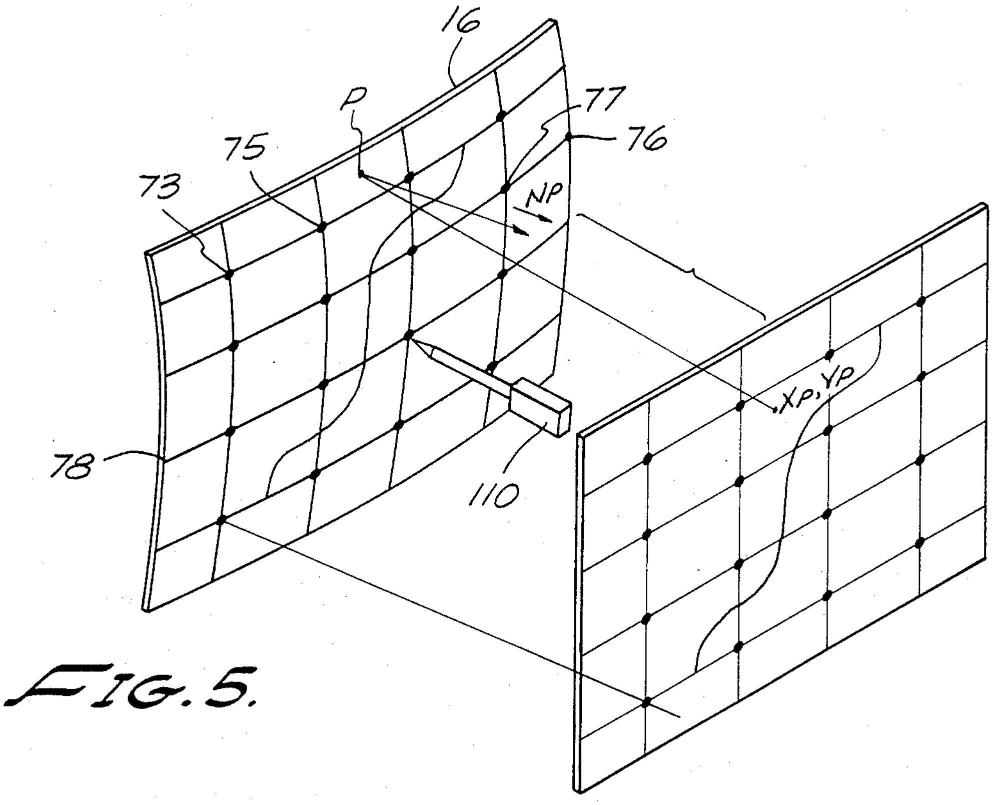
FIG. 5 is a diagramatic view illustrating the manner in which data measuring points are defined on the workpiece and the manner of projecting these points onto an X-Y plane.

Considering first the method of measurement of wall thickness of the workpiece contemplated by the present invention, it is apparent that through selective actuation of the first, second and third drive means of the rectilinear robot, the measuring sensor carried by the tool holding means of the robot can successively be aligned with each of the multiplicity of points which have been identified on the surface of the workpiece. For example, by referring to FIG. 5 it can be seen that the sensor can first be aligned with a starting point such as point 73. The tool holder can then be moved by the third drive means along the Z axis of the apparatus to position the ultrasonic sensor in an optimum spaced apart location relative to the surface of the workpiece. The wall thickness measurement can then be taken at this point in the manner previously described. Using the first drive means, the sensor can then be moved horizontally relative to the workpiece along an X axis to a second point 75. If necessary, the sensor can once again be moved along the Z axis to position it in a proper spaced apart orientation with respect to the surface of the part. The wall thickness measurement at point 75 can then be taken. The measurement process can be continued by moving the sensor along an X axis until the right edge of the part is viewed in FIG. 5 is reached. Using the second drive means, the sensor can then be moved vertically downwardly along track 33 to a second starting point 76. Following wall thickness measurement at this point, the sensor can once again be moved horizontally in the opposite direction, that is to the left, to a point 77 on the grid wherein the next wall thickness measurement can be accomplished. This process of successive horizontal movement of the sensor can then be repeated until the left edge of the part 16 is reached. At this point, the sensor can once again be moved vertically downwardly along track 33 to a third starting point 78, located at the left edge of the part 16. By repeating the aforementioned process, it is apparent that the entire surface of the workpiece can be traversed by the sensor. Accordingly, data with respect to the wall thickness of the part can be obtained at each of the intersection points of the grid lines formed on the surface of the part 16.

Figure 7:
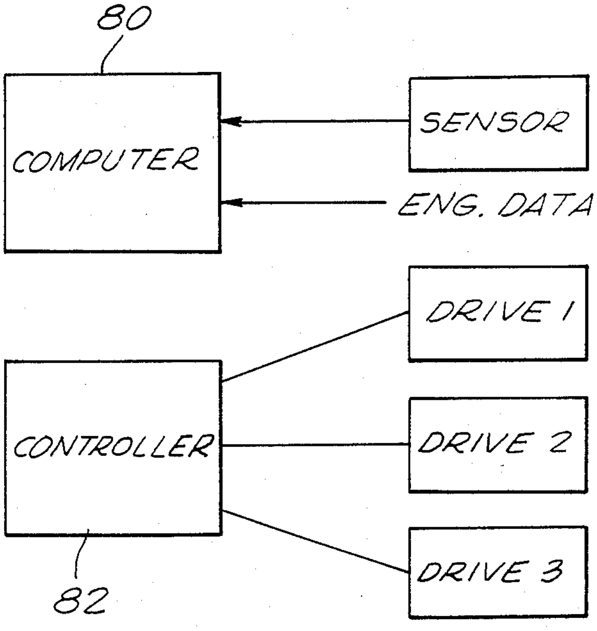
FIG. 7 is a block diagram illustrating the interrelationship between the major component parts of the apparatus of the invention.

In these instances where only a small number of wall thickness measurements need be made on a particular part, the operation of the rectilinear robot and the collection of wall thickness data necessary to plot the wall thickness contours of the part can be accomplished with minimum difficulty. However, when the parts are very large and the wall thickness of the part must be determined accurately at a very large numbers of points across the surface of the workpiece, a more sophisticated approach to controlling the robot and recovering and processing the wall thickness data is required. Such an approach is particularly necessary where the workpiece being measured exhibits a compound curved surface, rather than merely a substantially planar surface. For Example, in determining the wall thickness of certain parts having compound curved surfaces, computer graphic technique may be required and, in some cases, it may also be necessary to frequently move the sensor along the Z axis of the robot prior to accomplishing the measurement at the various points on the grid. To enable the wall thickness measurements to be made on large complexly configured workpieces, one embodiment of the present invention embodies a host computer which is adapted to process data taken from the rectilinear robot and to direct the first, second and third drive means of the robot through a robot controller means to which the rectilinear robot is operably coupled. Such an arrangement is illustrated schematically in FIG. 7. Referring to FIG. 7, the host computer 80 will be required to receive measurement information from the previously described ultrasonic sensor means. It will also be required to receive engineering data which defines the engineering features required on a particular part. In a manner presently to be described, the computer 80 must be capable of processing the data received from the sensor as well as the inputted engineering data to define the specific regions of the workpiece which must be chemically milled to achieve final end product part specifications. The computer 80 must also be capable of interconnection with a controller 82 which in turn is operably interconnected with the first, second and third drive means which control the selective positioning of the tool holding means of the robot relative to the work piece 16. Several computer systems as well as electronic controller systems compatible therewith are readily commercially available and can readily be programmed to accomplish the functions described by programmers skilled in the art. By way of example, computer systems suitable for use in the present application are available from manufacturers such as Lomas Data, Compupro and Seattle Computer.

Before proceeding with a more detailed description of the manner in which the computer and controller are interfaced with the rectilinear robot, it is to be observed that through the use of this more sophisticated system, it becomes possible to use the rectilinear robot not only to obtain wall thickness measurements using the ultrasonic sensor, but also to accomplish the automatic scribing of the maskant using a suitable scribing, or cutting, means which can be interconnected with the wrist connector 39. The cutting means adaptable for use with the robot can be provided in the form of a simple knife, or scribing tool, adapted to be carried by the wrist connector 39, or it may be a more elaborate cutting means, such as the laser device generally illustrated in FIG. 6. The laser, or "light amplification by stimulated emission of radiation", device, is a device for transforming incoherent light of various frequencies of vibration into a very narrow intense beam of coherent light. This narrow beam of coherent light can be used to accomplish various operations, including the cutting of the maskant material 49 which is used to cover the workpiece 16. Fortuitously, the nature of a low power laser device is such that the laser beam will quickly and efficiently cut the plastic maskant, but will have absolutely no adverse effect on the surface of the workpiece itself. Accordingly, the laser provides a highly suitable cutting means for use in the practice of the method of the present invention.

Figure 6:
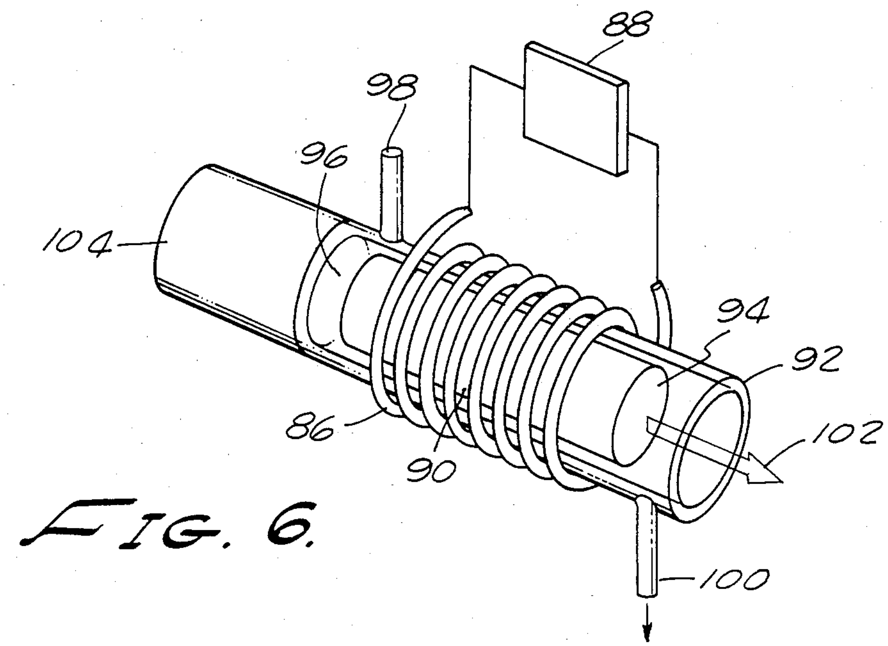
FIG. 6 is a generally schematic view of a low power laser device used in controllably cutting maskant material covering the surfaces of the workpiece.

Once again, low power laser devices suitable for the present application are commercially available. As illustrated in FIG. 6, these commercially available, low power laser devices typically comprise a flash lamp 86 which is suitably interconnected with a power source 88. The flash lamp surrounds a ruby rod 90 which is positioned within a housing 92 and is provided with a partially reflective surface 94 at one end thereof. A reflective surface 96 is provided at the closed end of the housing 92 along with a coolant inlet 98 which permits coolant to be introduced into the housing and emitted through the coolant outlet 100 disposed at the opposite end of the housing. Activation of the laser device will cause the emission of the intense beam of coherent light indicated by the numeral 102 in FIG. 6. It is this beam of light which is directed at the maskant 49 covering the part and which efficiently functions to cleanly cut the maskant along desired contour lines. To permit the laser device to be mounted within the connector means 39 of the tool holding means, a cylindrical shank portion 104 is provided at the rear end of the laser device. This shank portion 104 is closely receivable within the counterbore formed in the ball portion **39*b* of the connector 39. It is to be understood that the laser device illustrated in FIG. 6** is exemplary only and that various types of low power lasers, including carbon dioxide lasers, could also be used as the maskant cutter.

Returning once again to a consideration of the use of the host computer and controller means in accomplishing the wall thickness measurement method of the invention, the controller 82 is adapted to move the tool holding means of the robot in one of two modes. In one mode, the controller causes the tool holding means to move from one point to another point, as for example, from one point 70, shown on the grid illustrated in FIG. 4, to a second point 72. In this mode, the controller directs the robot to stop its movement each time it reaches the second measurement point. The other mode of operation of the device is a continuous path mode, wherein the controller directs the robot to move the tool holding means smoothly through a series of points without stopping at each point. The points of measurement on the workpiece can be defined in one of three ways, that is, by manually positioning the robot and instructing the host computer to remember the points, by keyboard entry, or by communication with the host computer through a pre-programmed software system. In practice, using the device of the present invention, both the scanning and maskant cutting operations can suitably be accomplished in the continuous path mode with the host computer directing the controller to move the tool holder of the robot by a continuous motion through an array of points communicated to the controller by the host computer. However, during engineering feature scribing and part inspection, the commands given by the controller will preferably involve both continuous path and point to point motion with the point data "learned" by the computer from a master or drawn from a pre-programmed computer software system.

Considering now the problems associated with the use of the apparatus of the invention in connection with workpieces having compound curved surfaces, basic techniques of computer graphics must be applied. In this regard, arbitrary three dimensional surfaces are often mathematically represented using bicubic spline interpolation. FIG. 5 generally illustrates this type of procedure. First, a number of points are measured on the three dimensional surface to be represented. Next third order polinomial splines are generated and smoothing functions are applied. After further necessary mathematical calculations, a representation of the surface will exist in the host computer such that it is possible to interpolate the Z value of any arbitrary point P on the surface knowing only $X_p$ and $Y_p$ (see FIG. 5). It is also possible to calculate the vector $N_p$ which is normal to the surface at point P. When measuring workpieces having compound curved surfaces, the ability to calculate a Z value and a nominal vector for any point on the surface is highly desirable during the ultrasonic measuring and contour line drawing methods of the present invention.

The basic data points to which splines can be fit may be drawn from a pre-programmed data base or measured directly off an actual workpiece master. In the latter case, to assist in obtaining data, a telescoping linear motion potentiometer sensor 110 (FIG. 5) having about 0.5 inches of travel is affixed to the tool holding means of the rectilinear robot. Such sensors and their method of use are well known by those skilled in the art. In obtaining the necessary data for present application, sensor 110 will be stopped at each point on the desired data grid, and then moved along the Z axis until the sensor point touches the workpiece. After all mechanical transient motions are settled, a Z measurement will be recorded which corresponds to the known X and Y coordinates of the particular point. Thus the system will proceed on a point by point basis gathering the necessary surface data to satisfy the spline routines.

The Z value and normal vector data corresponding to each grid point on the surface of the workpiece as obtained from the spline routine described in the preceding paragraph is then used in accomplishing the wall thickness measurement and in preparing an accurate thickness contour map on the workpiece. It is to be appreciated that, in order to develop an accurate thickness contour map on a large workpiece having a compound curved surface, a large number of thickness data points must be taken. Accordingly use of a computer 80 and controller 82 in the practice of the method of the invention is most desirable.

Using the apparatus as configured in FIG. 7, the wall thickness data will normally be collected during a raster scanning-type operation. A square grid (square when projected into the X-Y plane as illustrated in FIG. 5) approximately 0.4 to 0.8 inches per side is preferably selected. As previously mentioned, the Z value and the normal vector corresponding to each grid point can be obtained from the spline routine. The surface points and normal vectors are used to command the robot in a continuous motion mode over each grid line. In practice, data can be taken "on the fly" at a rate of 20 to 200 inches per second. Data thus taken can be stored in the computer memory or on a computer disk.

Once the thickness data for each point on the compound curved grid shown in FIG. 5 is obtained, the data must be converted into three-dimensional contour lines. This can be accomplished by projecting the data points into an X-Y plane in the manner illustrated in FIG. 5. This projection of data into the X-Y plane is simply a matter of using the X and Y components of the point. However, projecting the data back to the workpiece requires application of the data obtained in the previously discussed spline routine to account for the Z-Y component.

Once the contour data has been obtained and programmed into the computer, the computer will be capable of readily commanding the controller to drive the first, second and third drive means in a manner to accomplish the expeditious cutting of the maskant along the contour lines defined in and selected by the computer.

Programming the computer to consider engineering features such as holes, ribs, lands and so forth, as well as the thickness data measured from the workpiece can be accomplished in several ways. One of the most simple and straightforward ways is to manually move the robot over the desired path on a master workpiece and instructing the computer to "remember" the motion followed by the robot. The computer can then direct the robot to simply repeat on production workpieces the same series of special motions it has "learned" from the master workpiece.

Finally, the apparatus of the present invention can advantageously be used to perform the final inspection of the workpiece by once again "teaching" the computer through the use of a teach pendant, specialized end affectors and the master mold. End affectors such as tactile sensors, ultrasonic sensors, video systems or caliper-like scanners can be used to locate edges, measure rib widths, measure thicknesses and generally perform all of the inspection functions required on the finished part. Once again, the basic requirement of the final product inspection system is to adequately "teach" the computer the routine to be followed in the inspection step so that the computer can direct the controller to move the first, second and third drive systems of the robot through the inspection routine.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A method of measuring the wall thickness of a generally planar shaped and a compound curved shaped workpiece at a multiplicity of locations using an ultrasonic sensor carried by a holding device adapted to locate the sensor adjacent the surface of the workpiece and to permit controllable movement of the sensor relative thereto horizontally, vertically and along axes extending perpendicularly from the surface of the part, said sensor being adapted to direct an ultrasonic sound pulse at the workpiece, detect the pulse echos reflected from the first and second surfaces of the work piece and measure the time between said echos whereby the thickness of the work piece can be calculated, said method comprising the steps of:

(a) identifying a multiplicity of horizontally and vertically spaced apart points on the surface of the workpiece;

(b) positioning the sensor proximate one of said points;

(c) moving the sensor along a first transverse axis extending perpendicularly from said point on the surface to a position wherein the sensor is spaced apart from the surface a predetermined distance;

(d) actuating the sensor to determine the wall thickness at said point;

(e) moving the sensor relative to the work piece to a position wherein it is proximate another of said points;

(f) actuating the sensor to determine the wall thickness at said latter point;

(g) successively repeating the movement of the sensor relative to the work piece to a position proximate each of the said multiplicity of points; and (h) actuating the sensor to determine the wall thickness at each of said multiplicity of points.

2. A method as defined in claim 1 in which prior to actuating the sensor, the sensor is moved along a transverse axis extending perpendicularly from each of said multiplicity of points to position the sensor a predetermined distance from the surface at each said point.

3. A method as defined in claim 1 in which the multiplicity of spaced apart points are located at the intersections of a plurality of lines extending horizontally and vertically across the surface of the part to form a grid-like configuration.

4. A method as defined in claim 3 in which said lines are equally spaced apart by a predetermined distance.

5. A method as defined in claim 4 including the step of interconnecting adjacent points of equal wall thickness within a region of the part to represent the topography of the surface within said region.

6. A method of measuring the wall thickness of a generally planar shaped and a compound curved shaped workpiece at a multiplicity of locations using an ultrasonic sensor carried by a holding device adapted to locate the sensor adjacent the surface of the workpiece and to permit controllable movement of the sensor relative thereto horizontally, vertically and along axes extending perpendicularly from the surface of the part, said sensor being adapted to direct an ultrasonic sound pulse at the workpiece, detect the pulse echos reflected from the first and second surfaces of the work piece and measure the time between said echos whereby the thickness of the work piece can be calculated, said method comprising the steps of:

(a) positioning the sensor proximate a first starting point on the surface of the work piece;

(b) moving the sensor along a first transverse axis extending perpendicularly from said first starting point on the surface to a position wherein the sensor is spaced apart from the surface a predetermined distance;

(c) actuating the sensor to determine the wall thickness at said first starting point;

(d) moving the sensor in one direction a predetermined distance along a first horizontal axis to a second point horizontally spaced apart from said first starting point;

(e) actuating the sensor to determine the wall thickness at said second point;

(f) repeating the movement of the sensor by a predetermined distance successively along said first horizontal axis to a plurality of points horizontally spaced apart from said first starting point;

(g) actuating the sensor at each of said plurality of points along said first horizontal axis to determine the wall thickness at each of said plurality of points;

(h) moving the sensor a predetermined distance along a first vertical axis to a second starting point located on a second horizontal axis vertically spaced apart from said first horizontal axis;

(i) moving the sensor in the opposite direction a predetermined distance along said second horizontal axis to a point horizontally spaced apart from said second starting point;

(j) actuating the sensor to determine the wall thickness at said point;

(k) repeating the movement of the sensor by a predetermined distance successively along said second horizontal axis to a plurality of points horizonally spaced apart from said second starting point;

(l) actuating the sensor at each of said plurality of points along said second horizontal axis to determine the wall thickness at each of said plurality of points;

(m) moving the sensor a predetermined distance along a second vertical axis to a third starting point located on a third horizontal axis vertically spaced apart from said first horizontal axis;

(n) moving the sensor in said one direction a predetermined distance along said third horizontal axis to a point horizontally spaced apart from said third starting point;

(o) actuating the sensor to determine the wall thickness of said point;

(p) repeating the movement of the sensor by a predetermined distance successively along said third horizontal axis to a plurality of points horizontally spaced apart from said third starting point;

(q) actuating the sensor at each of said plurality of points along said third horizontal axis to determine the wall thickness at each of said plurality of points;

(r) repeating the movement of the sensor along said first and second vertical axes to position said sensor at a plurality of starting points located on a plurality of horizontal axes vertically spaced apart from said first horizontal axis; and (s) repeating the movement of the sensor by a predetermined distance successively along said plurality of said horizontal axes to a plurality of spaced apart points and actuating said sensor at each of said points to determine the wall thickness at each of said points.

7. A method of chemically milling a generally planar spaced and a compound curved shaped non-uniform wall thickness workpiece to form a workpiece of generally uniform wall thickness, comprising the steps of:

(a) covering the front and rear surfaces of the workpiece with a thin layer of protective material;

(b) measuring the wall thickness of the workpiece at a multiplicity of locations using an ultrasonic sensor carried by a holding device adapted to locate the sensor adjacent the surface of the workpiece and to permit controllable movement of the sensor relative thereto horizontally, vertically and along axes extending perpendicularly from the surface of the part, said sensor being adapted to direct an ultrasonic energy wave at the workpiece, and to sense the echos of energy waves when they strike a surface, said measuring step including the steps of:

(1) positioning the sensor proximate a first point on the surface of the workpiece;

(2) moving the sensor along a transverse axis extending perpendicularly from said first point on the surface to a position wherein the sensor is spaced apart from the surface of said protective covering by predetermined distance;

(3) actuating the sensor to direct sound waves toward the workpiece;

(4) sensing a first echo of the sound waves as they strike the surface of said protective covering;

(5) sensing a second echo of the said waves as they strike said front surface of the work piece;

(6) sensing a third echo of the sound waves as they strike said rear surface of the workpiece;

(7) measuring the elapsed time between sensing of said second and third echos;

(8) calculating the wall thickness of the workpiece at said first point based upon said measured elapsed time;

(9) successively positioning said sensor proximate a multiplicity of spaced apart points on the surface of the workpiece and repeating the steps of subparagraphs (4) through (8);

(c) defining areas on said front surface of the work piece corresponding to regions of the workpiece having substantially uniform wall thickness;

(d) categorizing said areas in terms of the respective wall thickness thereof from areas of greatest wall thickness to areas of least wall thickness;

(e) selectively removing said protective covering in said areas to successively expose regions of the workpiece having progressively lesser wall thickness;

(f) successively immersing the workpiece into a chemical etching solution following each removal of said protective coating in a given area to chemically mill away material in said exposed regions;

(g) repeating the steps of paragraphs (e) and (f) until the desired uniformity of wall thickness of the workpiece is achieved.

8. A method as defined in claim 7 in which prior to being actuated, the sensor is moved along a transverse axis extending perpendicularly from each point of said multiplicity of points to position the sensor at a predetermined distance from the surface of said protective covering.

9. A method as defined in claim 7 in which the step of defining areas on said front surface comprises the steps of:

(a) identifying within defined regions of the surface those points wherein the workpiece is of substantially the same wall thickness; and (b) interconnecting said points to represent the topography of the surface within said region.

10. A method as defined in claim 9 in which said step of removing said protective covering comprises:

(a) replacing the ultrasonic sensor carried by the holding device with cutting means for cutting said protecting covering;

(b) locating said cutting means in an operable position relative to said protective covering;

(c) controllably moving said cutting means relative to said workpiece to cause said means to selectively transverse said interconnections of points wherein the workpiece is of the same wall thickness whereby said protective coating will be cut along said interconnections; and (d) stripping away said protective coating covering said selected area defined by said interconnections.

11. A method as defined in claim 10 in which a host computer means is operably coupled with said sensor for receiving signals therefrom and for storing and processing said signals, said method including the step of transmitting to said host computer means at each of said multiplicity of points a signal corresponding to the wall thickness of the workpiece at each of said multiplicity of spaced apart points.

12. A method as defined in claim 11 in which said host computer means is operably coupled with drive means for moving said cutting means; said method including the step of processing said wall thickness signals to identify regions of the workpiece which are of substantially uniform wall thickness and selectively activating said host computer means to cause said drive means to move said cutting means relative to said workpiece along predetermined first paths.

13. A method as defined in claim 12 including the step of introducing engineering feature data into said host computer causing said host computer means to process said data in combination with said wall thickness signals; to derive information usable in identifying surface areas on said work piece which correspond to regions of the workpiece wherein material must be removed; and causing said host computer means to use said derived information to control said drive means in a manner to move said cutting means along predetermined second paths corresponding to said identified surface areas.

14. An apparatus for use in connection with the chemical milling of workpieces, comprising:

(a) a tool holder;

(b) a first means for moving said tool holder rectilinearly in a first direction;

(c) a second means for moving said tool holder rectilinearly in a second direction;

(d) a third means for moving said tool holder rectilinearly in a third direction;

(e) an ultrasonic measuring means adapted to be carried by said tool holder for measuring the wall thickness of the workpiece at a multiplicity of spaced apart points; and (f) a workpiece supporting means for supporting the workpiece in a close proximity with said tool holder.

15. An apparatus as defined in claim 14 including a cutting means adapted to be carried by said tool holder for cutting a thin film of maskant material covering the workpiece.

16. An apparatus as defined in claim 14 in which said workpiece supporting means is adapted to support the workpiece in a manner such that the surface to be milled is positioned in a substantially vertical orientation.

17. An apparatus as defined in claim 16 in which said first means is adapted to move said tool holder in a substantially horizontal direction, said second means is adapted to move said tool holder in a substantially vertical direction; and said third means is adapted to move said tool holder in a direction generally perpendicular to the plane of the surface of the workpiece to be milled.

18. An apparatus for use in measuring the wall thickness of a thin sheet metal workpiece covered with a thin layer of maskant material comprising a workpiece supporting frame for supporting the workpiece substantially vertically and a rectilinear robot disposed proximate said workpiece supporting frame, said robot comprising:

(a) a support;

(b) first and second spaced apart, generally horizontally extending tracks carried by said support;

(c) a carriage reciprocally movable along said first and second tracks, said carriage including a substantially vertically extending track;

(d) shuttle means carried by said vertically extending track for reciprocal movement therealong;

(e) tool holding means carried by said shuttle means for reciprocal movement with respect thereto in a direction toward and away from the workpiece; and (f) measuring means carried by said tool holding means for measuring the wall thickness of the workpiece at a multiplicity of spaced apart points, said means comprising:

(1) means for transmitting sound waves toward the workpiece;

(2) sensor means for sensing a first sound wave echo produced when said sound wave strikes the surface of the maskant, for sensing a second sound wave echo produced when said sound wave strikes the surface of the workpiece and for sensing a third sound wave echo produced when said sound wave strikes the rear surface of the workpiece; and (3) means for measuring the time elapsed between said sensor sensing said second and third sound wave echos.

19. An apparatus as defined in claim 18 in which said ultrasonic measuring means includes signal means for generating and transmitting electrical signals corresponding to said measured elapsed time determined at each of said multiplicity of spaced apart points and in which said apparatus further includes a host computer means operably interconnected with said signal means for receiving, sorting and processing electrical signals generated by said signal means.

20. An apparatus as defined in claim 19 including cutting means carried by said tool holding means for cutting the maskant material.

21. An apparatus as defined in claim 20 in which said cutting means comprises a low power laser device.

22. An apparatus as defined in claim 20 including (a) first drive means for moving said carriage along said first and second tracks;

(b) second drive means for moving said shuttle means along said vertically extending track; and (c) third drive means for moving said tool holding means toward and away from the workpiece.

23. An apparatus as defined in claim 22 in which said host computer means is operably interconnected with said first, second and third drive means and is adapted to selectively actuate said means to controllably position said tool holding means relative to the workpiece.

* * * * *